(12) United States Patent
Post

(10) Patent No.: US 7,876,010 B2
(45) Date of Patent: Jan. 25, 2011

(54) PASSIVE MAGNETIC BEARING CONFIGURATIONS

(75) Inventor: Richard F. Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 290 days.

(21) Appl. No.: 12/100,395

(22) Filed: Apr. 9, 2008

(65) Prior Publication Data

US 2008/0252162 A1    Oct. 16, 2008

Related U.S. Application Data

(60) Provisional application No. 60/923,140, filed on Apr. 11, 2007.

(51) Int. Cl.
  *H02K 7/09* (2006.01)
  *H16C 19/00* (2006.01)
(52) U.S. Cl. ................... 310/90.5; 29/898
(58) Field of Classification Search .............. 310/90.5; 29/898
See application file for complete search history.

(56) References Cited

U.S. PATENT DOCUMENTS

| 3,434,084 A |   | 3/1969  | Milligan |
|---|---|---|---|
| 3,693,086 A | * | 9/1972  | Redecker et al. ............ 324/155 |
| 5,495,221 A |   | 2/1996  | Post |
| 5,847,480 A |   | 12/1998 | Post |
| 6,280,090 B1 | * | 8/2001 | Stephens et al. ............ 384/284 |
| 7,023,117 B2 |   | 4/2006  | Fremerey |

FOREIGN PATENT DOCUMENTS

| AU | 761353 B2   | 6/2003  |
|---|---|---|
| WO | WO/01/84693 | 11/2001 |

\* cited by examiner

*Primary Examiner*—Quyen Leung
*Assistant Examiner*—David W. Scheuermann
(74) *Attorney, Agent, or Firm*—John P. Wooldridge

(57) ABSTRACT

A journal bearing provides vertical and radial stability to a rotor of a passive magnetic bearing system when the rotor is not rotating and when it is rotating. In the passive magnetic bearing system, the rotor has a vertical axis of rotation. Without the journal bearing, the rotor is vertically and radially unstable when stationary, and is vertically stable and radially unstable when rotating.

22 Claims, 4 Drawing Sheets

PASSIVE MAGNETIC BEARING CONFIGURATIONS

This application claims priority to U.S. Provisional Patent Application Ser. No. 60/923,140, filed Apr. 11, 2007, titled: "Vertical-Axis Passive Magnetic Bearing Configuration", incorporated herein by reference.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to electrostatic generators and motors, and more specifically, it relates to passive magnetic bearing configurations.

2. Description of Related Art (WO/2001/084693) "Full Levitation Bearing System With Improved Passive Radial Magnetic Bearings" The invention provides a full levitation magnetic bearing that uses improved passive radial and axial magnet bearings and an active axial magnetic thrust actuator for axial stabilization. The passive radial magnetic bearings are especially suited for full levitation magnetic bearing systems, because they allows full levitation support with simple, low cost single axis active control. The bearings use multiple axially magnetized, concentric magnet rings or, alternatively in another embodiment, concentric magnetized ring portions of a single block of magnetic material attached to the stationary portion, cooperating with pole rings on the axial face of a ferromagnetic rotating portion. This cooperation creates both an axial attractive force and passive radial centering forces, as the pole rings tend to align with the stationary permanent magnet rings. In a preferred embodiment, the concentric permanent magnet rings are arranged with alternating axial polarities for generation of maximum radial stiffness.

'693 is directed to a magnetic bearing that is a simple combination of passive magnetic bearing elements that are stable against radial displacements plus active stabilization means for axial displacements (which are otherwise unstable).

U.S. Pat. No. 5,847,480, titled: "Passive magnetic bearing element with minimal power losses", is directed to systems employing passive magnetic bearing elements having minimal power losses are provided. Improved stabilizing elements are shown, employing periodic magnet arrays and inductively loaded circuits, but with improved characteristics compared to the elements disclosed in U.S. Pat. No. 5,495,221 entitled "Dynamically Stable Magnetic Suspension/Bearing System." The improvements relate to increasing the magnitude of the force derivative, while at the same time reducing the power dissipated during the normal operation of the bearing system, to provide a passive bearing system that has virtually no losses under equilibrium conditions, that is, when the supported system is not subject to any accelerations except those of gravity. '480 uses a combination of radially stable passive bearings together with a null-type induction-driven passive magnetic bearing element that providces axial stabilization characterized by very small power losses at equilibrium.

U.S. Pat. No. 7,023,117, titled: "Magnetic bearing arrangement" is direct to a magnetic bearing arrangement (1) for a motion element, having the following features: the magnetic bearing arrangement has a stator. The magnetic bearing arrangement has a passive magnetic bearing (3, 8, 9) for lateral guidance of the motion element (2) and a controllable magnetic bearing (3, 5) for guidance of the motion element perpendicular to the guidance by way of the passive magnetic bearing. The controllable magnetic bearing has an electronic stabilization device; the stabilization device has an electrical conductor (6, 7) that can have an electrical control current applied to it by the stabilization device and that is associated with the stator element (5) in such a way that the magnetization of the stator element is influenced by the control current. The controllable magnetic bearing has a permanent magnet (3); the permanent magnet is arranged on the motion element opposite the stator element. The magnetic force between permanent magnet and stator element is dimensioned such that with a control current of zero, the motion element is held in the working position; and only upon deviation from that working position is a control current generated that influences the magnetization of the stator element in the direction of re-establishing the working position. '117 pertains to a radially stable passive bearing similar to Gabrys', also with y means for axial stabilization employing electron feedback.

All three of the cited patents employ elements that are radially stable but axially unstable. In the work to date at Lawrence Livermore National Laboratory (LLNL) on passive magnetic bearings, the approach has been to achieve stability, in this case only in the rotating state, by using rotating Halbach arrays to generate currents in stationary "stabilizer" element windings. These currents, interacting back on the Halbach array fields, then produce strong centering forces, thereby overcoming the strictures of Earnshaw's Theorem. The stabilizer, however, also introduces some parasitic losses and is still somewhat complex.

A passive magnetic bearing is desirable that is stable against axial displacements and that enables a radial stabilizing force that approaches zero when the system is centered, where the amount of stabilizing force required is small and the drag forces exerted will be small. The present invention fulfils such a desire.

SUMMARY OF THE INVENTION

It is an object of the present invention to provide a journal bearing that provides vertical and radial stability, in both the static and dynamic state, to a vertical axis rotor of a passive magnetic bearing system.

This and other objects will be apparent based on the disclosure herein.

The invention is a passive magnetic bearing configuration that is simple and satisfies operational and economic requirements for a bulk-storage electromechanical battery system aimed at diurnal or longer-time use cycles. These requirements include: (1) very low parasitic losses to permit charging-discharging cycles where there may be many hours (or days) between the time that the system is charged and that when the stored energy is used, (2) decades-long service life without maintenance, and (3) as-low-as-possible capital cost.

A passive magnetic bearing system includes a rotor having a vertical axis of rotation. When stationary, the rotor is vertically and radially unstable, and when rotating, the rotor is vertically stable and radially unstable. A journal bearing is provided that provides vertical and radial stability to the rotor when the rotor is not rotating and when it is rotating. U.S.

patent application Ser. No. 11/932,329, filed Oct. 31, 2007, titled: "An Improved Electrostatic Generator/Motor" is incorporated herein by reference.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
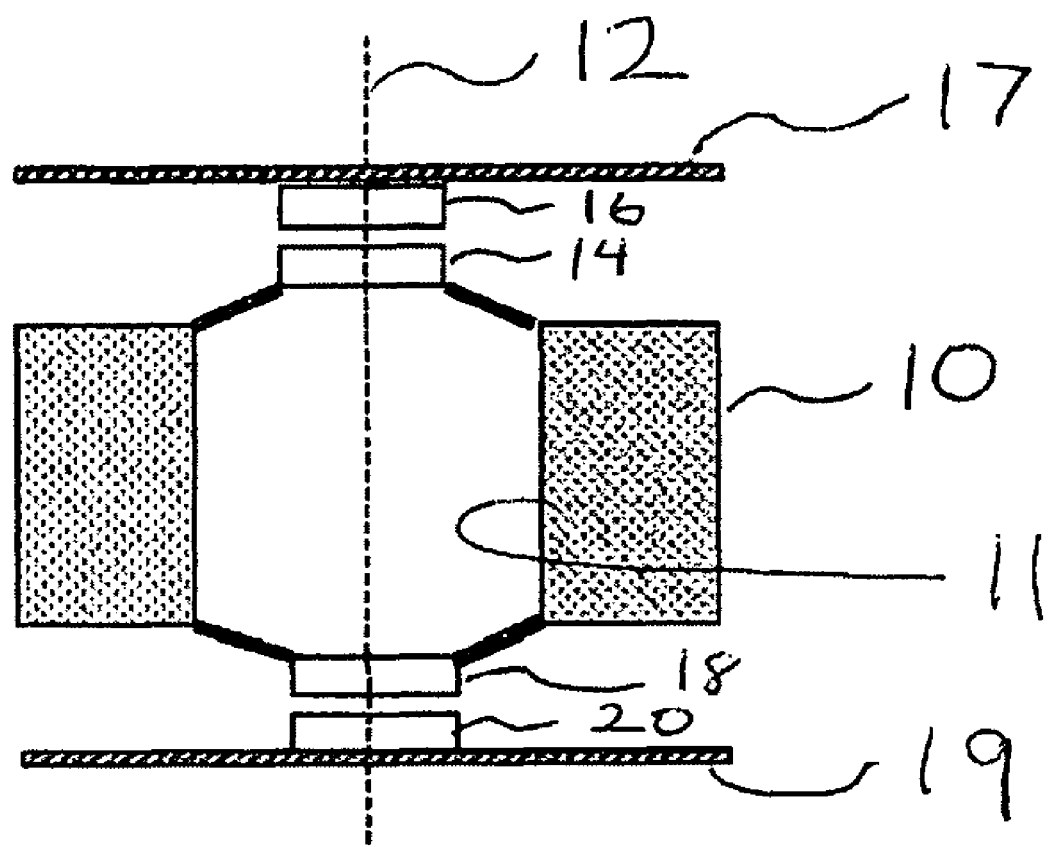
FIG. 1 shows a rotor and upper and lower bearing elements of the present invention, but without stabilization against lateral displacements.

The bearing design starts with one of the simplest forms that a magnetic bearing/suspension system using permanent magnets to levitate a flywheel rotor might take. As illustrated schematically in FIG. 1, the rotor 10, the axis of rotation (shown as dashed line 12) of which is vertical, is mounted between two circular iron poles (with internal permanent-magnet material to magnetize them). The upper pole faces (14, 16) are attractive, supplying a portion of the required levitating force, and at the same time providing a centering action against transverse displacements of the top portion of the rotor. Upper pole face 16 is firmly attached to a mounting structure 17. To provide the rest of the levitating force, the lower pole faces (18, 20) repel each other. Lower pole face 20 is firmly attached to a mounting structure 19. With proper relative sizing of the poles, the rotor weight will be supported stably with respect to vertical displacements about the force-equilibrium position. However, from Earnshaw's Theorem, the system must be unstable against some particular displacement from equilibrium. In this case, that displacement from equilibrium is a lateral motion of the bottom of the rotor, followed by a vertically downward motion resulting from loss of equilibrium. The task then is, in the simplest way possible, to find a way to stabilize the lower bearing element from lateral displacements.

Figure 2:
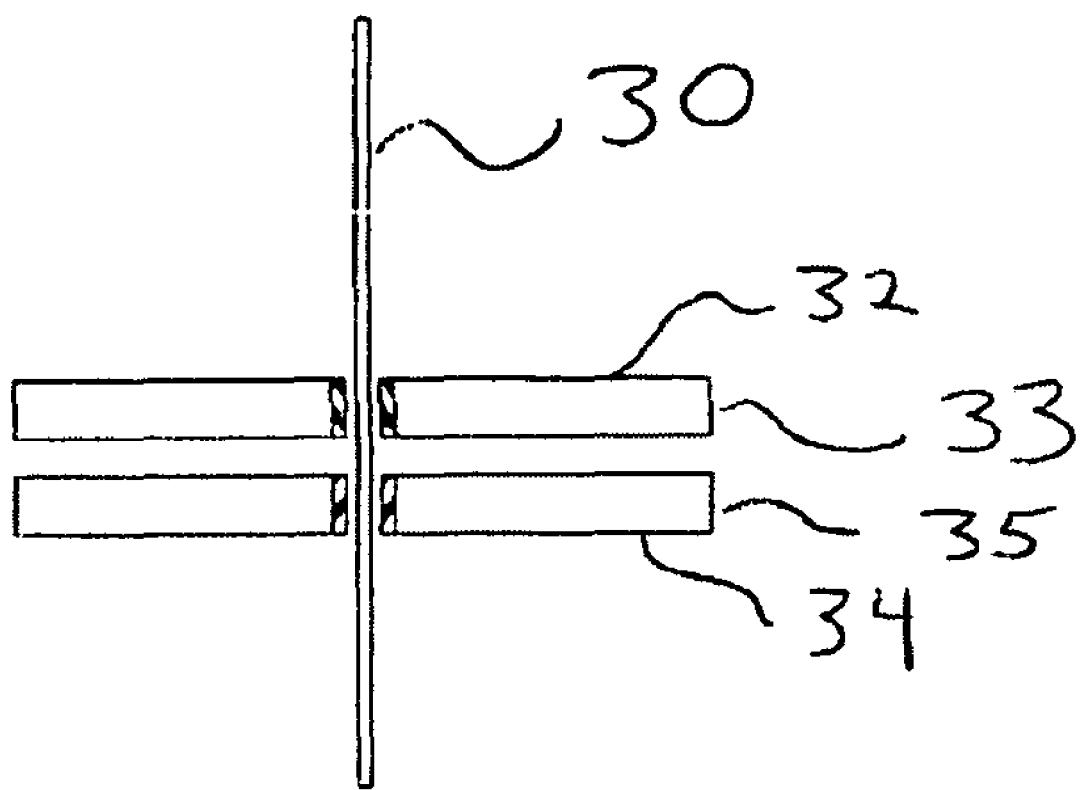
FIG. 2 shows an embodiment of a miniature journal bearing of the present invention.

The present approach assures stable levitation both statically and in the rotating state. The lower bearing element of FIG. 1 is stabilized by means of a miniaturized journal bearing, lubricated in situ, e.g., by low-vapor-pressure lubricant. FIG. 2 shows a schematic drawing of one form of this miniature journal bearing. It should be emphasized that for the case at hand, where the axis of rotation is vertical (within tolerance errors) and the rotor assembly is well balanced, the journal bearing will have to sustain little or no transverse load. Its only role is to provide stabilization through having a positive stiffness that is greater than the negative stiffness of the lower magnetic bearing element Analysis of the rotor-dynamics of any specific rotor/bearing system, including gyroscopic effects, will be useful in optimizing that particular system.

As shown in FIG. 2, the bearing shaft 30, non-rotating in this application, is composed of small-diameter steel "piano wire" (in the example case, 0.010" diameter). This wire is tensioned between two stationary support elements (e.g., elements 17 and 19 of FIG. 1). The upper part of wire 30 passes through the center of the upper magnetic bearing elements 14 and 16. In one embodiment, the "journal" consists of two metal plates 32, 34, through which a small hole has been drilled, leaving a clearance of a fraction of a thousandth of an inch around the wire-base shaft 30. By using a steel wire of 0.010" diameter and a clearance of a fraction of a thousandth of an inch for the clearance holes for the wire through the two metal plates 32, 34, the lifetime of the journal bearing is extended. The distance traveled, during one revolution of the rotor, by a point on the inside diameter of the clearance hole, decreases as the hole diameter decreases.

The embodiment of FIG. 2 can be attached to the rotator assembly of FIG. 1, to provide lateral stability. The metal plates 32 and 34 could be attached at a lower position of rotor 10. Outside diameter face 33 of metal plate 32 can, e.g., be attached to the inside face 11 of rotor 10 of FIG. 1. Likewise, outside diameter face 35 of metal plate 34 can also, e.g., be attached to the inside face 11 of rotor 10 of FIG. 1. One embodiment uses only a single metal plate such as metal plate 32 to provide stabilization. The use of two plates (such as metal plates 32 and 34), however, has been found to be easier to implement than a single plate. To provide lateral stabilization, the journal bearing should be near the unstable portion of the passive magnetic bearing system. In this case, the journal bearing should be placed near the laterally unstable elements 18 and 20. Another journal bearing can be used near the top elements 14 and 16 if the attractive force between them is not sufficient to provide a centering action.

One design includes a tap in these holes, made with a fine-thread tapping tool, with the threads being oriented so as to "pump" a lubricant such as vacuum grease toward the midplane between the two journal plates. Another design employs a lubrication reservoir containing vacuum grease attached to the wire below the journal-bearing elements. The end result of whatever design is used is to produce and maintain a thin film of low-vapor-pressure lubricant between the shaft and the journal plates. In another embodiment, the journal bearing is formed of a fluoropolymer (e.g., Teflon®) which provides its own lubrication.

Using the appropriate formulae, the viscous losses in the miniature bearing have been calculated, finding a dissipation of about 8 milliwatts at a speed of 10,000 RPM. The reason for the small value is, as discussed above, because of the very slow peripheral speeds and the small area of the miniaturized journal bearing. Not only is this loss too small to create appreciable heating, but also it leads to very long rundown times for the rotor, provided other losses, such as those of aerodynamic origin, are also small. Estimates of these and other possible losses that would affect the rundown time are discussed below. To make quantitative the rundown times, a drag power amounting to 8 milliwatts would lead to a rundown time constant (for a rotor storing 10 kwhr of energy) of about 14 years! It is clear that bearing losses substantially larger than those estimated above would still be quite acceptable for use in a bulk-storage system.

Since a key purpose of the new bulk-storage system is to insure the longest possible rundown times, the drag losses of aerodynamic origin are calculated that would occur at the operating vacuum of the system. For a vacuum pressure of $10^{-5}$ Torr, for example, the rundown time constant is of the order of 100 days. Residual drag losses of electromagnetic origin from the permanent-magnet-excited circular pole faces are also very small. It should be noted that Professor Beams of the University of Virginia, in his "ultracentrifuge" studies of the 1960s using photo-cell-controlled active stabilization, observed rundown time constants in vacuo in excess of 2 years for high-speed circular rotors suspended magnetically below a circular pole face.

Momentary-ontact "snubber" bearings can be incorporated into the design of FIG. 2. The snubber bearings can be designed to accommodate, e.g., both seismic loads and shocks occurring in shipping the units from the factory. Exemplary snubber bearings are disclosed in U.S. Pat. No. 5,783,885, titled "Self-adjusting magnetic bearing systems," incorporated herein by reference.

Figure 3:
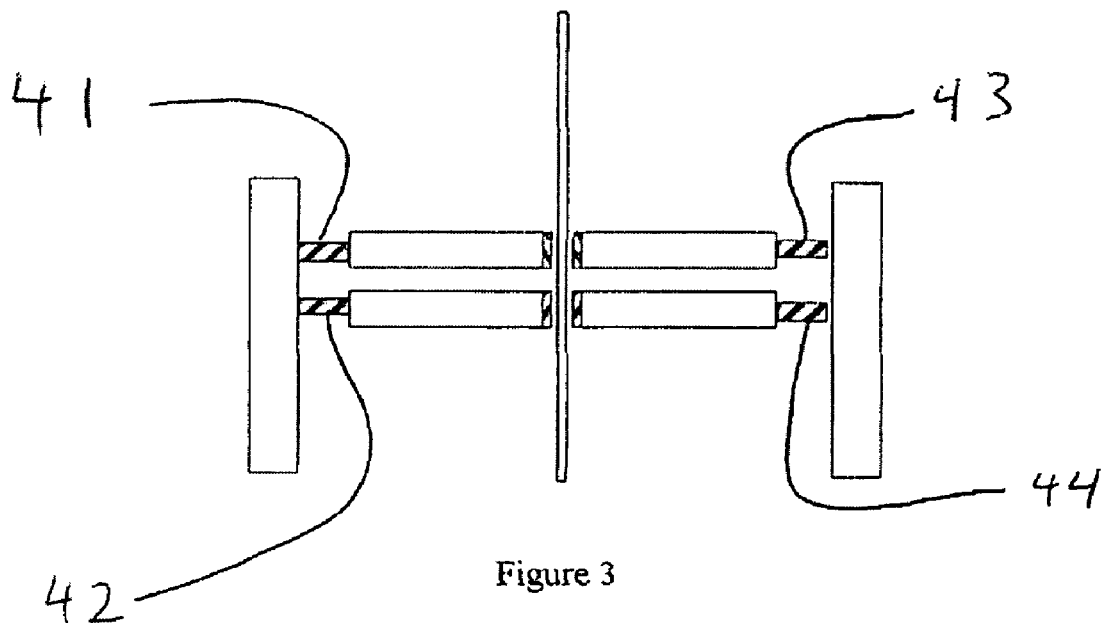
FIG. 3 shows an embodiment of a centrifugally disengaging miniature journal bearing according to the present invention.

The bearing geometry has the seeds of a radically different possibility: gyroscopically stabilized, contact-less operation, leading to a bearing system with "infinite" operating life and near-zero drag losses. Those familiar with the "Levitron" toy, a gyroscopically stabilized, magnetically levitated, spinning top, will recognize this possibility. By designing the present miniature journal bearing to disengage under centrifugal forces, centrifugal stabilization will take over, as in the Levitron, and friction drag forces and friction wear and lubrication issues disappear, leaving a stable and completely wear-free bearing system, one made entirely from inexpensive materials. Such an achievement is the first of its kind, and could make a sea change in the practicality of bulk-storage of energy in flywheel systems. FIG. 3 shows schematically one way that centrifugal disengagement can be caused to occur, in this case by incorporating spring-loading elements 41-44 into the supports for the journal-bearing elements. The journal bearing is split into two halves so that it can separate itself centrifugally from the central-axis wire at rotation speeds that are above a critical speed, determined by the stiffness of the springs and the mass of the journal bearing elements. The springs are attached to the rotating element of the device sought to be stabilized, e.g., to face 11 of rotor 10 of FIG. 1.

Figure 4:
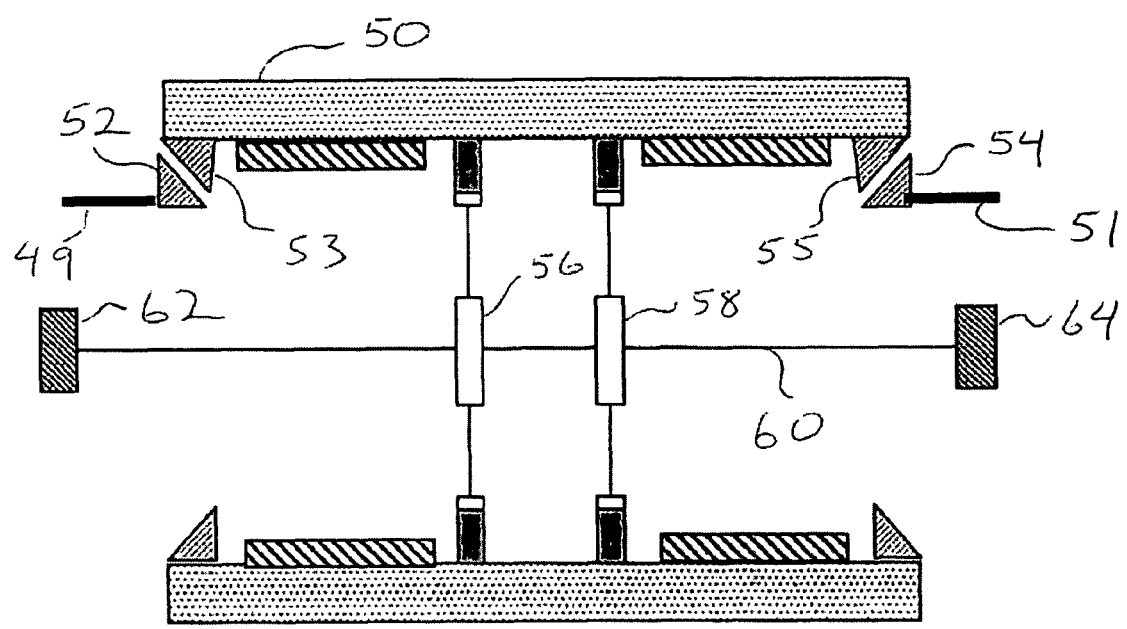
FIG. 4 is horizontal-axis embodiment of the present invention.

FIG. 4 shows a cross-sectional drawing of a horizontal-axis flywheel rotor 50 where levitation and axial centering is provided by, in this example, the magnetic bearing consisting of a combination of stationary arcuate repelling permanent-magnet elements 52, 54 and rotating ring-shape bearing elements 53, 55. Stationary element 52 is supported with a support structure 49. Stationary element 54 is supported with a support structure 51. These elements could be comprised of opposing Halbach arrays the periodicity of which varies in the r-z plane, i.e., the variation in field does not occur in the azimuthal direction so that at constant gap a constant repelling force exists between the bearing elements during rotation of the rotor. In the example shown, in the absence of the stabilizing journal bearings the system would be tilt-unstable. That is, while it would be stably centered axially, and stably levitated by the arcuate repelling elements, it would be unstable against a tilting motion, as predicted by Earnshaw's Theorem. Stabilization against tilt is therefore provided by the pair of journal bearings 56, 58 and tensioned wire 60 as shown in the drawing. The wire is tensioned between supporting structure 62 and 64. The reason for locating these bearings in the central portion of the rotor is to allow access to the field windings (not shown) or other structure, e.g. the stator of an electrostatic generator.

Accordingly, a variety of exemplary embodiments of a passive magnetic bearing system have been described. Other embodiments will be apparent to those skilled in the art as a result of this disclosure. One embodiment discussed above includes a rotor having a vertical axis of rotation; a first circular magnetic element fixedly attached to an upper portion of said rotor; a second circular magnetic element fixedly attached to a support structure external to said rotor, wherein said first circular magnetic element and said second circular magnetic element attract each other; a third circular magnetic element fixedly attached to a lower portion of said rotor; a fourth circular magnetic element fixedly attached to a support structure external to said rotor, wherein said third circular magnetic element and said fourth circular magnetic element repel each other; a shaft fixedly attached external to said rotor and collinear with said vertical axis of rotation; and at least one journal bearing element attached to said rotor, wherein said journal bearing comprises a hole that allows passage of said shaft. The journal bearing element operates with said shaft to provide vertical and radial stability to said rotor when said rotor is not rotating and when said rotor is rotating. The journal bearing element may comprise a plate or multiple plates, which e.g., could be parallel and could be formed of a metal or a fluoropolymer. The journal bearing element may comprise a self-lubricating mechanism and may include a means for retracting from said shaft upon a centrifugal force. The first circular magnetic element and second circular magnetic element supply a portion of a levitating force to levitate said rotor. The first circular magnetic element and second circular magnetic element further provide a centering force against transverse displacements of said upper portion of said rotor. The third circular magnetic element and fourth circular magnetic element supply a portion of a levitating force to levitate said rotor. The first portion of levitating force together with the second portion of levitating force provide sufficient force to levitate said rotor. A journal bearing for attachment to a rotor of a passive magnetic bearing system is described, wherein said rotor comprises a vertical axis of rotation and further includes a first circular magnetic element fixedly attached to an upper portion of said rotor and a third circular magnetic element fixedly attached to a lower portion of said rotor; wherein said bearing system further comprises a second circular magnetic element fixedly attached to a support structure external to said rotor, wherein said first circular magnetic element and said second circular magnetic element attract each other; wherein said bearing system further comprises a fourth circular magnetic element fixedly attached to a support structure external to said rotor, wherein said third circular magnetic element and said fourth circular magnetic element repel each other; wherein said journal bearing comprises: a shaft fixedly attached external to said rotor and collinear with said vertical axis of rotation; and at least one journal bearing element attached to said rotor, wherein said journal bearing element comprises a hole that allows passage of said shaft. A passive magnetic bearing system is described that comprises a rotor having a vertical axis of rotation, wherein when stationary, said rotor is vertically and radially unstable, wherein when rotating, said rotor is vertically stable and radially unstable; a shaft fixedly attached to a mount external to said rotor, wherein said shaft is aligned to said vertical axis of rotation; and at least one journal bearing element fixedly attached to said rotor, wherein said journal bearing element comprises plate with a hole, wherein said hole is located at said vertical axis of rotation and wherein said shaft passes through said hole, wherein said journal bearing element and said shaft provide vertical and radial stability to said rotor when said rotor is not rotating and when said rotor is rotating. A method for fabricating a passive magnetic bearing system is described, comprising: providing a rotor having a vertical axis of rotation; fixedly attaching a first circular magnetic element to an upper portion of said rotor; fixedly attaching a second circular magnetic element to a support structure external to said rotor, wherein said first circular magnetic element and said second circular magnetic element attract each other; fixedly attaching a third circular magnetic element to a lower portion of said rotor; fixedly attaching a fourth circular magnetic element to a support structure external to said rotor, wherein said third circular magnetic element and said fourth circular magnetic element repel each other; attaching at least one journal bearing element to said rotor, wherein said journal bearing comprises a hole; and fixedly attaching a shaft to a mount external to said rotor, wherein said shaft us located on said vertical axis of rotation and passes through said hole.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A passive magnetic bearing system, comprising:
   a rotor having a vertical axis of rotation;
   a first circular magnetic element fixedly attached to an upper portion of said rotor;
   a second circular magnetic element fixedly attached to a support structure external to said rotor, wherein said first circular magnetic element and said second circular magnetic element attract each other;
   a third circular magnetic element fixedly attached to a lower portion of said rotor;
   a fourth circular magnetic element fixedly attached to a support structure external to said rotor, wherein said third circular magnetic element and said fourth circular magnetic element repel each other;
   a shaft fixedly attached external to said rotor and collinear with said vertical axis of rotation; and
   at least one journal bearing element attached to said rotor, wherein said journal bearing comprises a hole that allows passage of said shaft, wherein said shaft passes through said hole and wherein said shaft is not fixedly attached to said rotor.

2. The system of claim 1, wherein said journal bearing element operates with said shaft to provide vertical and radial stability to said rotor when said rotor is not rotating and when said rotor is rotating.

3. The system of claim 2, wherein said at least one journal bearing element comprises a plate.

4. The system of claim 3, wherein said plate comprises a metal plate.

5. The system of claim 3, wherein said plate comprises a fluoropolymer.

6. The system of claim 2, wherein said at least one journal bearing element comprises a pair of parallel metal plates.

7. The system of claim 2, wherein said at least one journal bearing element comprises a self-lubricating mechanism.

8. The system of claim 2, wherein said at least one journal bearing element comprises means for retracting from said shaft upon a centrifugal force.

9. The system of claim 8, wherein said means for retracting comprises at least one spring located between said at least one journal bearing element and said rotor, wherein one end of said spring is fixedly attached to said rotor and another end of said spring is fixedly attached to said at least one journal bearing element.

10. The system of claim 1, wherein said shaft comprises a wire.

11. The system of claim 1, wherein said first circular magnetic element and said second circular magnetic element supply a portion of a levitating force to levitate said rotor.

12. The system of claim 11, wherein said first circular magnetic element and said second circular magnetic element further provide a centering force against transverse displacements of said upper portion of said rotor.

13. The system of claim 1, wherein said third circular magnetic element and said fourth circular magnetic element supply a portion of a levitating force to levitate said rotor.

14. The system of claim 1, wherein said first circular magnetic element and said second circular magnetic element supply a first portion of levitating force to levitate said rotor, wherein said first circular magnetic element and said second circular magnetic element further provide a centering force against transverse displacements of said upper portion of the rotor assembly and wherein said third circular magnetic element and said fourth circular magnetic element supply a second portion of levitating force to levitate said rotor.

15. The system of claim 14, wherein said first portion of levitating force together with said second portion of levitating force provide sufficient force to levitate said rotor.

16. A journal bearing for attachment to a rotor of a passive magnetic bearing system, wherein said rotor comprises a vertical axis of rotation and further includes a first circular magnetic element fixedly attached to an upper portion of said rotor and a third circular magnetic element fixedly attached to a lower portion of said rotor; wherein said bearing system further comprises a second circular magnetic element fixedly attached to a support structure external to said rotor, wherein said first circular magnetic element and said second circular magnetic element attract each other; wherein said bearing system further comprises a fourth circular magnetic element fixedly attached to a support structure external to said rotor, wherein said third circular magnetic element and said fourth circular magnetic element repel each other; wherein said journal bearing comprises:
   a shaft fixedly attached external to said rotor and collinear with said vertical axis of rotation; and
   at least one journal bearing element attached to said rotor, wherein said journal bearing element comprises a hole that allows passage of said shaft, wherein said shaft passes through said hole and wherein said shaft is not fixedly attached to said rotor.

17. The journal bearing of claim 16, wherein said at least one journal bearing element comprises a self-lubricating mechanism.

18. The journal bearing of claim 16, wherein said at least one journal bearing element comprises means for retracting from said shaft upon a centrifugal force.

19. The journal bearing of claim 18, wherein said means for retracting comprises at least one spring located between said at least one journal bearing element and said rotor, wherein one end of said spring is fixedly attached to said rotor and another end of said spring is fixedly attached to said at least one journal bearing element.

20. A method for fabricating a passive magnetic bearing system, comprising:
   providing a rotor having a vertical axis of rotation;
   fixedly attaching a first circular magnetic element to an upper portion of said rotor;
   fixedly attaching a second circular magnetic element to a support structure external to said rotor, wherein said first circular magnetic element and said second circular magnetic element attract each other;
   fixedly attaching a third circular magnetic element to a lower portion of said rotor;

fixedly attaching a fourth circular magnetic element to a support structure external to said rotor, wherein said third circular magnetic element and said fourth circular magnetic element repel each other;

attaching at least one journal bearing element to said rotor, wherein said journal bearing comprises a hole; and fixedly attaching a shaft to a mount external to said rotor, wherein said shaft is located on said vertical axis of rotation and passes through said hole, wherein said shaft is not fixedly attached to said rotor.

21. The method of claim 20, wherein said at least one journal bearing element comprises means for retracting from said shaft upon a centrifugal force.

22. A method for stabilizing a passive magnetic bearing system that includes a rotor comprising a vertical axis of rotation and further includes a first circular magnetic element fixedly attached to an upper portion of said rotor and a third circular magnetic element fixedly attached to a lower portion of said rotor; wherein said bearing system further comprises a second circular magnetic element fixedly attached to a support structure external to said rotor, wherein said first circular magnetic element and said second circular magnetic element attract each other; wherein said bearing system further comprises a fourth circular magnetic element fixedly attached to a support structure external to said rotor, wherein said third circular magnetic element and said fourth circular magnetic element repel each other; wherein said method comprises:

fixedly attaching a shaft to a mount external to said rotor, wherein said shaft is aligned with said vertical axis of rotation; and attaching at least one journal bearing element to said rotor, wherein said journal bearing element comprises a hole that allows passage of said shaft, wherein said shaft passes through said hole and wherein said shaft is not fixedly attached to said rotor.

* * * * *